(12) United States Patent
Cho et al.

(10) Patent No.: US 11,668,311 B2
(45) Date of Patent: Jun. 6, 2023

(54) BLOWERS WITH VARIABLE NOZZLES

(71) Applicant: TECHTRONIC CORDLESS GP, Anderson, SC (US)

(72) Inventors: Hang Man Cho, Seoul (KR); Michael Coltharp, Atlanta, GA (US); Dong Heon Han, Daejeon (KR); Peter Kaminski, Atlanta, GA (US); Graham Langford, Winston-Salem, NC (US); Peyton Lee, Cordele, GA (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 17/520,578

(22) Filed: Nov. 5, 2021

(65) Prior Publication Data
US 2023/0147771 A1 May 11, 2023

(51) Int. Cl.
*A01G 20/47* (2018.01)
*F04D 27/00* (2006.01)
*F04D 29/40* (2006.01)

(52) U.S. Cl.
CPC ........... *F04D 27/002* (2013.01); *A01G 20/47* (2018.02); *F04D 29/403* (2013.01)

(58) Field of Classification Search
CPC ........ F04D 27/002; F04D 29/043; F01D 9/04; F01D 9/1714–148; F01D 9/16–167; A01G 20/47; A47L 5/24; A47L 5/28
See application file for complete search history.

(56) References Cited

U.S. PATENT DOCUMENTS

| | | | | | |
|---|---|---|---|---|---|
| 4,884,314 | A | * | 12/1989 | Miner | A01G 20/47 15/419 |
| 5,950,276 | A | * | 9/1999 | Everts | A01G 20/47 15/418 |
| 7,637,095 | B2 | * | 12/2009 | Winter | F02K 1/15 60/226.1 |
| 11,185,198 | B2 | * | 11/2021 | Hoffman | A47L 9/2878 |
| 2015/0366424 | A1 | * | 12/2015 | Naka | E01H 1/0809 239/590.5 |
| 2019/0335964 | A1 | * | 11/2019 | Hoffman | A47L 9/2878 |

FOREIGN PATENT DOCUMENTS

DE       102020208636 A1 *  1/2021

\* cited by examiner

*Primary Examiner* — Brian P Wolcott
(74) *Attorney, Agent, or Firm* — Dority & Manning, P.A.

(57) ABSTRACT

Blowers with variable nozzles are provided. A blower includes a fan, and a main body housing the fan, the main body defining an airflow path extending between an inlet end and an outlet end. A blower further includes a variable nozzle disposed at the outlet end. The variable nozzle includes an attachment collar, the attachment collar comprising a body defining an exterior surface and an interior surface and extending along a longitudinal axis. The variable nozzle further includes a plurality of air control bodies, each of the plurality of air control bodies movably connected to the attachment collar and comprising an air control surface and an extension rod. The variable nozzle further includes an adjustment collar, the adjustment collar disposed around the attachment collar and defining a plurality of adjustment channels, wherein each of the plurality of extension rods is disposed in one of the plurality of adjustment channels.

18 Claims, 8 Drawing Sheets

BLOWERS WITH VARIABLE NOZZLES

FIELD

The present disclosure relates generally to blowers, and more particularly to blowers with variable nozzles for adjusting the velocity and pressure of air flowing therethrough.

BACKGROUND

Portable hand-held blowers are popular for, for example, home maintenance and commercial landscaping tasks. Typical hand-held blowers are either powered by gasoline engines or electric motors. A fan is connected to the motor or engine and rotates within a blower housing. The fan generates an air flow that is directed towards an outlet of the housing, such as through an extension tube that is connected to or integral with the housing, to direct the air flow from the housing therethrough. The air flow is then exhausted from the outlet.

In many cases it is advantageous for a user to adjust the velocity and pressure of the exhausted air flow. Many known blowers simply achieve higher velocity/pressure at the outlet by increasing fan speed. However, increasing the fan speed is not always desirable, as the corresponding increase in engine or motor speed can result in reduced operating times and efficiency. For example, when the engine or motor speed is increased, turbulence may occur due to excessive pressure difference (between nozzle outlet and motor inlet). This may reduce efficiency. In some cases, known blowers offer multiple separate interchangeable nozzles, with each nozzle having a differently sized exhaust outlet. However, adjusting the velocity and pressure in these cases involves manually removing one nozzle and attaching a different nozzle, which can be a tedious process. Further, there is a risk of one or more of these nozzles being misplaced and lost.

Accordingly, improved apparatus for adjusting blower air flow velocity and pressure is desired.

BRIEF DESCRIPTION

Aspects and advantages of the invention in accordance with the present disclosure will be set forth in part in the following description, or may be obvious from the description, or may be learned through practice of the technology.

In accordance with one embodiment, a blower is provided. The blower includes a fan, and a main body housing the fan, the main body defining an airflow path extending between an inlet end and an outlet end. The blower further includes a variable nozzle disposed at the outlet end, the variable nozzle defining a longitudinal axis and a circumferential axis. The variable nozzle includes an attachment collar, the attachment collar comprising a body defining an exterior surface and an interior surface and extending along the longitudinal axis. The variable nozzle further includes a plurality of air control bodies, each of the plurality of air control bodies movably connected to the attachment collar and comprising an air control surface and an extension rod. The variable nozzle further includes an adjustment collar, the adjustment collar disposed around the attachment collar and defining a plurality of adjustment channels, wherein each of the plurality of extension rods is disposed in one of the plurality of adjustment channels.

In accordance with another embodiment, a blower is provided. The blower includes a fan, and a main body housing the fan, the main body defining an airflow path extending between an inlet end and an outlet end. The blower further includes a variable nozzle disposed at the outlet end, the variable nozzle defining a longitudinal axis and a circumferential axis. The variable nozzle includes an attachment collar, the attachment collar comprising a body defining an exterior surface and an interior surface and extending along the longitudinal axis. The variable nozzle further includes a plurality of air control bodies, each of the plurality of air control bodies movably connected to the attachment collar and comprising an air control surface and an extension rod. The variable nozzle further includes an adjustment collar, the adjustment collar disposed around the attachment collar and defining a plurality of adjustment channels, wherein each of the plurality of extension rods is disposed in one of the plurality of adjustment channels. Rotation of the adjustment collar about the longitudinal axis causes movement of each of the plurality of adjustment channels relative to the extension rod disposed therein and in turn causes movement of the plurality of air control bodies.

In accordance with another embodiment, a variable nozzle is provided. The variable nozzle includes one or more components or features as discussed herein.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation, of the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Referring now to FIGS. 1 through 8, embodiments of blowers 10 in accordance with the present disclosure are illustrated. Blowers 10 in accordance with the present disclosure advantageously include variable nozzles. Each variable nozzle includes a plurality of adjustable air control surfaces. For example, the air control surfaces are movable between multiple positions, such as between a first position and a second position. A tip end opening inner diameter defined by the air control surfaces is different in each position and is adjustable between the positions. For example, the tip end opening inner diameter in the first position is greater than the tip end opening inner diameter of the air control surfaces in the second position. Accordingly, as the air control surfaces are moved between the various positions, the velocity and pressure of air flowing through the tip end opening defined by the air control surfaces is adjusted. For example, as the air control surfaces are moved from the first position towards the second position, the velocity and pressure are increased, and as the air control surfaces are moved from the second position to the first position, the velocity and pressure is decreased. Advantageously, no adjustment in the fan speed of the blower is required for such velocity and pressure adjustments.

Adjustment of the variable nozzle in accordance with the present disclosure is advantageously simple and efficient. For example, a user may simply twist an adjustment collar of the variable nozzle to cause adjustment of the air control surfaces. Further, variable nozzles in accordance with the present disclosure may include other advantageous features. For example, such variable nozzles may include multiple different air control nozzle positions (such as two, three, four, five, six, seven, eight, or more), thus allowing a user to fine tune the desired velocity and pressure. Further, such variable nozzles may include additional flow-related features which facilitate improved air flow. Still further, such variable nozzles may include various assembly-related features which facilitate ease of assembly and use of such variable nozzles and blower generally.

Figure 1:
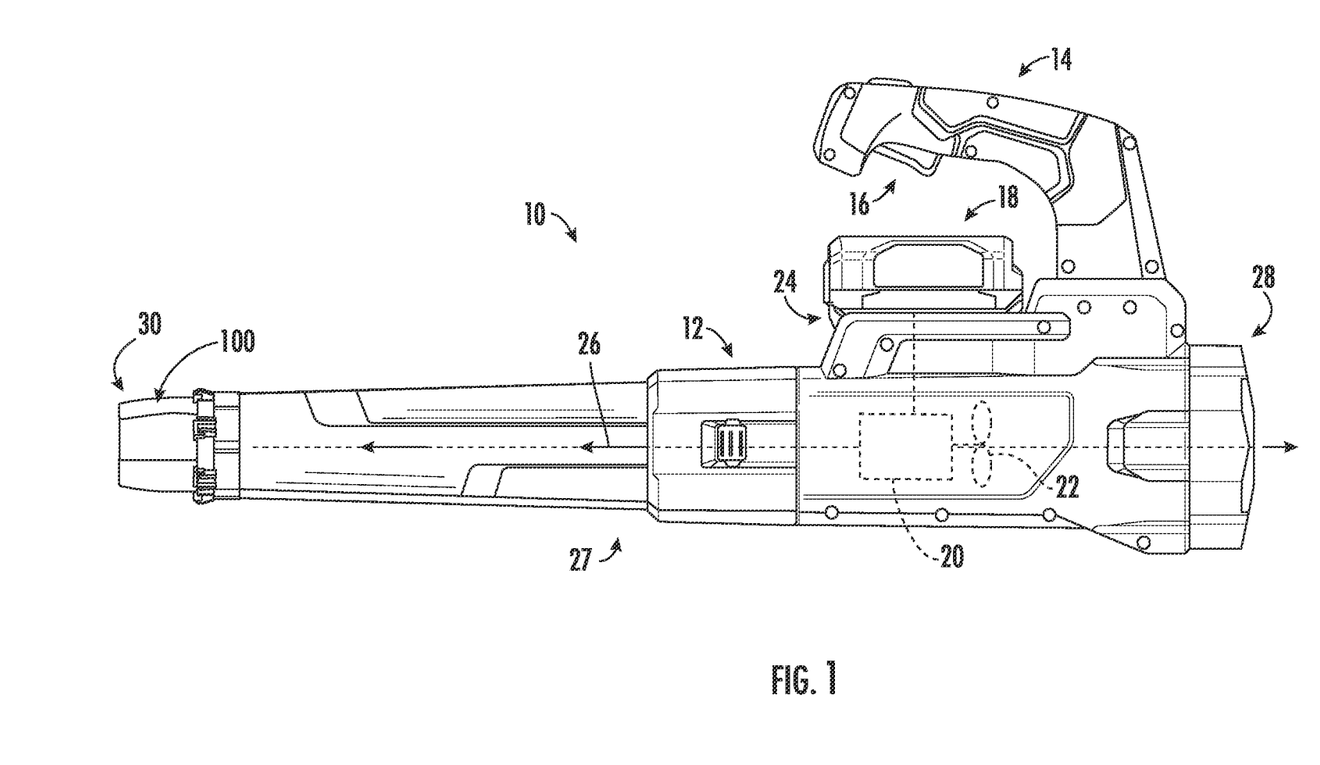
FIG. 1 is a side view of a blower in accordance with embodiments of the present disclosure.
Figure 2:
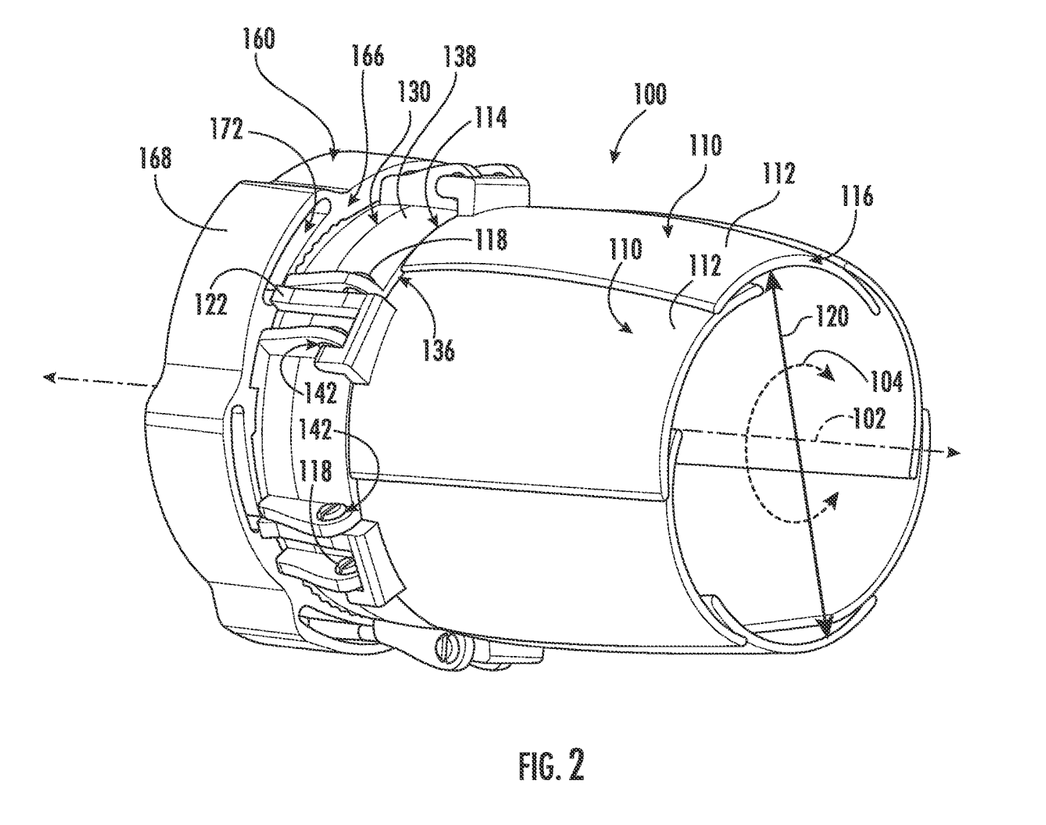
FIG. 2 is a perspective view of a variable nozzle in accordance with embodiments of the present disclosure.
Figure 3:
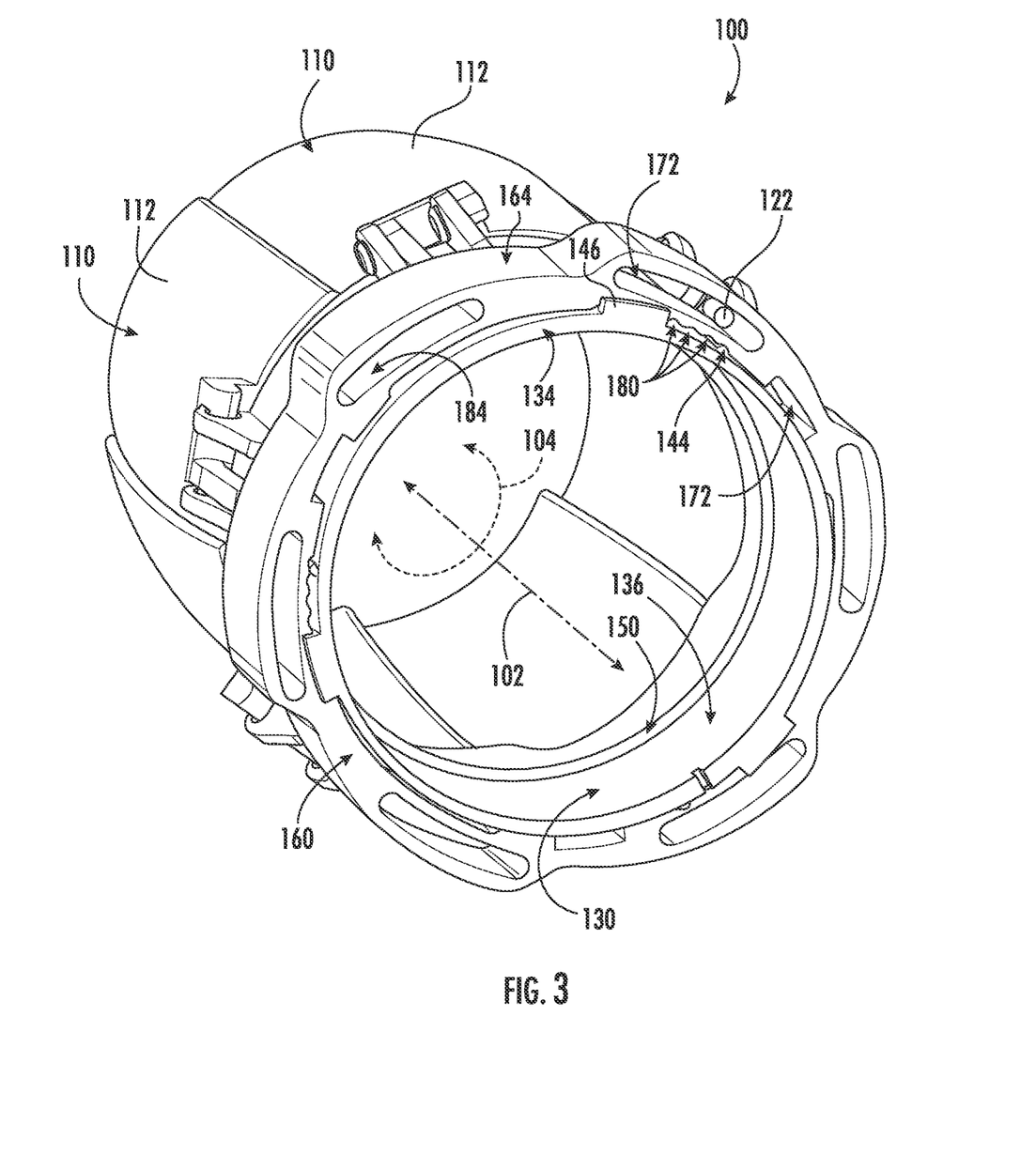
FIG. 3 is another perspective view of a variable nozzle in accordance with embodiments of the present disclosure.

Referring now to FIG. 1, a blower 10 in accordance with the present disclosure may include a main body 12. A handle 14 may be connected to and extend from the main body 12. A trigger 16 may be included in the handle 14. The trigger 16 may be operable to cause operation of the blower 10 by activating and deactivating a motor 20 of the blower 10, which in turn may operate a fan 22 of the blower to generate a flow of air through the main body 12. The trigger 16 may include variable speed selectivity, allowing the operator to variably control the power of the blower 10 within a preset range of speeds.

A battery 18 may be removably connected to the blower 10 to power the blower 10, and specifically the motor 20 thereof. A battery mount 24 may be defined in the main body 12, and the battery 18 may be removably connectable to the battery mount 24. When connected in and to the battery mount 24, the battery 18 may provide a source of power to the blower 10, and specifically the motor 20 thereof. Battery 18 and/or mount 24 may, for example, provide an electrical connection between the battery 18 and the motor 20.

Motor 20 and fan 22 may be disposed in the main body 12, such that main body 12 houses the fan 22 and motor 20. Main body 12 may fully or partially define an airflow path 26 therethrough. An extension tube(s) 27 may, in some embodiments, further define the airflow path 26. Extension tube 27 may be connected to or integral with main body 12. The airflow path 26 may extend between and define an inlet end 28 which defines an inlet and an outlet end 30 which defines an outlet. Airflow along the airflow path 26 may flow into the main body 12 through the inlet end 28 and inlet thereof and be exhausted from the main body 12 through the outlet end 30 and outlet thereof when the blower 10 is operated.

It should be understood that the present disclosure is not limited to electric blowers which utilize batteries and electric motors. In exemplary embodiments, operation of the fan 22 may generate an airflow which may flow through main body 12. Blower 10 may be a gas-powered, electric, or other suitably powered handheld blower 10. In some embodiments, for example, an electrically-powered motor such as motor 20 may be provided. The electrically-powered motor may be powered by electricity from an electrical socket via an electrical cord of the blower 10, or may be battery-powered and utilize a battery such as battery 18 in communication with the motor. Alternatively, a gas-powered engine may be provided. The motor or engine of the blower 10 may be connected to the fan, such that the fan 22 is rotatably driven by the motor or engine.

In some embodiments, the fan 22 may be an axial fan. Alternatively, fan 22 may be a non-axial fan.

In some embodiments, as illustrated, blowers in accordance with the present disclosure are handheld blowers. In other embodiments, blowers in accordance with the present disclosure may be "backpack" style or other suitable blowers.

As shown, a blower 10 may further include a variable nozzle 100. Nozzle 100 may be disposed at the outlet end 30 and may thus define the outlet. For example, the variable nozzle 100 may be connected to the main body 12 or extension tube 27 in order to be disposed at the outlet end 30. Variable nozzle 100 may define a longitudinal axis 102 (which may, for example, be coaxial with or perpendicular to airflow path 26). Variable nozzle 100 may further define a circumferential axis 104 which may extend circumferentially about longitudinal axis 102.

Referring now to FIGS. 1 through 8, variable nozzle 100 may include a plurality of adjustable air control bodies 110. Each of the plurality of air control bodies 110 includes an air control surface 112 which may form a portion of a nozzle defining an outlet of the blower. Each air control surface 112 may have a generally arcuate cross-sectional shape. Further, in some embodiments, each air control surface 112 may be formed from a suitable polymer, such as a suitable thermoplastic polymer. Particular examples of suitable materials may include polyolefins, such as polypropylene; polyamides, such as nylon; polyacetals, such as polyoxymethylene; or styrene polymers, such as ABS or polystyrene. Alternatively, however, other suitable materials may be utilized. In some embodiments, the material utilized to form the air control surfaces 112 may be a flexible material.

Each air control surface 112 may extend between a base end 114 and a tip end 116. Further, each air control body 110 may further include one or more hinge features, such as hinge pins 118 as shown or, alternatively, hinge holes or other suitable hinge features. The hinge features may be disposed at the base end 114, and may connect to mating hinge features on an attachment collar as discussed herein to movably connect the air control bodies 110 to the attachment collar. For example, movement of the air control bodies 110 may be pivoting of the air control bodies 110, such as about the hinge features.

The plurality of air control bodies 110 may be disposed in an annular array about the longitudinal axis 102. Further, when assembled, a maximum inner diameter 120 may be defined at the tip ends 116 of the air control surfaces 112. As discussed herein, movement of the air control bodies 110 may adjust, such as increase and/or decrease, the maximum inner diameter 120.

Each air control body 110 may further include an extension rod 122. The extension rod 122 may be disposed at the base end 114 and extend away from air control surface 112. Each extension rod 122 may interact with an adjustment channel of an adjustment collar, as discussed herein, to cause movement of the air control bodies 110.

Figure 4:
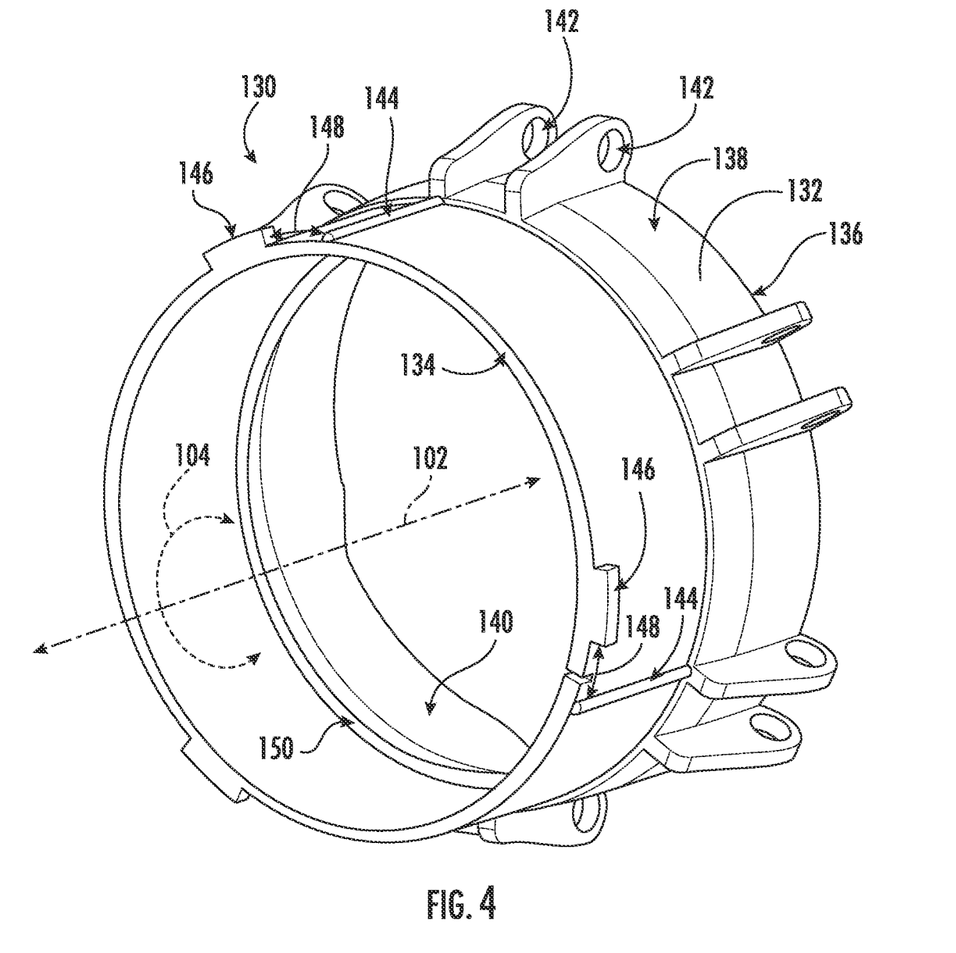
FIG. 4 is a perspective view of an attachment collar of a variable nozzle in accordance with embodiments of the present disclosure.

Variable nozzle 100 may further include an attachment collar 130. Attachment collar 130 may include a body 132, which may be a generally annular body as shown and which may extend along the longitudinal axis 102 between a rear end 134 and a front end 136. Body 132 may include an exterior surface 138 and an opposing interior surface 140. Attachment collar 130 may include a plurality of hinge features, such as hinge holes 142 or, alternatively, hinge pins or other suitable hinge features. The hinge features may connect to the mating hinge features of the air control bodies 110 to movably connect the air control bodies 110 to the attachment collar 130. For example, each hinge pin 118 may be insertable into a mating hinge hole 142 to movably connect the air control bodies 110 to the attachment collar 130. The hinge features may be disposed on or defined in the attachment collar 130 in a generally annular array about the body 132, such as about the longitudinal axis 102 and/or along the circumferential axis 104, such that the air control bodies 110 are disposed in an annular array when movably connected to the attachment collar 130. Hinge features may further be disposed at the front end 136.

Attachment collar 130 may further include one or more detent(s) 144. Each detent 144 may extend from the exterior surface 138, and further may extend along the longitudinal axis 102. For example, detent(s) 144 may extend from the rear end 134 towards the front end 136. Detent(s) 144 may interact with features of an adjustment collar as discussed herein to define multiple different positions of the air control surfaces.

Attachment collar 130 may further include one or more assembly tabs 146. Each assembly tab 146 may extend from the exterior surface 138, such as the rear end 134 of the attachment collar 130. A distance 148, such as an annular distance along the circumferential axis 104, may be defined at the rear end 134 between an associated detent 144 and assembly tab 146. Assembly tabs 146 may interact with features of an adjustment collar to facilitate ease of assembly and operation of the variable nozzle 100.

Attachment collar 130 may further include a lip 150. Lip 150 may be an annular lip, and may extend from the interior surface 140. Lip 150 may advantageously be in the air flow path 26, and may minimize turbulence as air flow passes through the attachment collar 130 and variable nozzle 100 generally.

Figure 5:
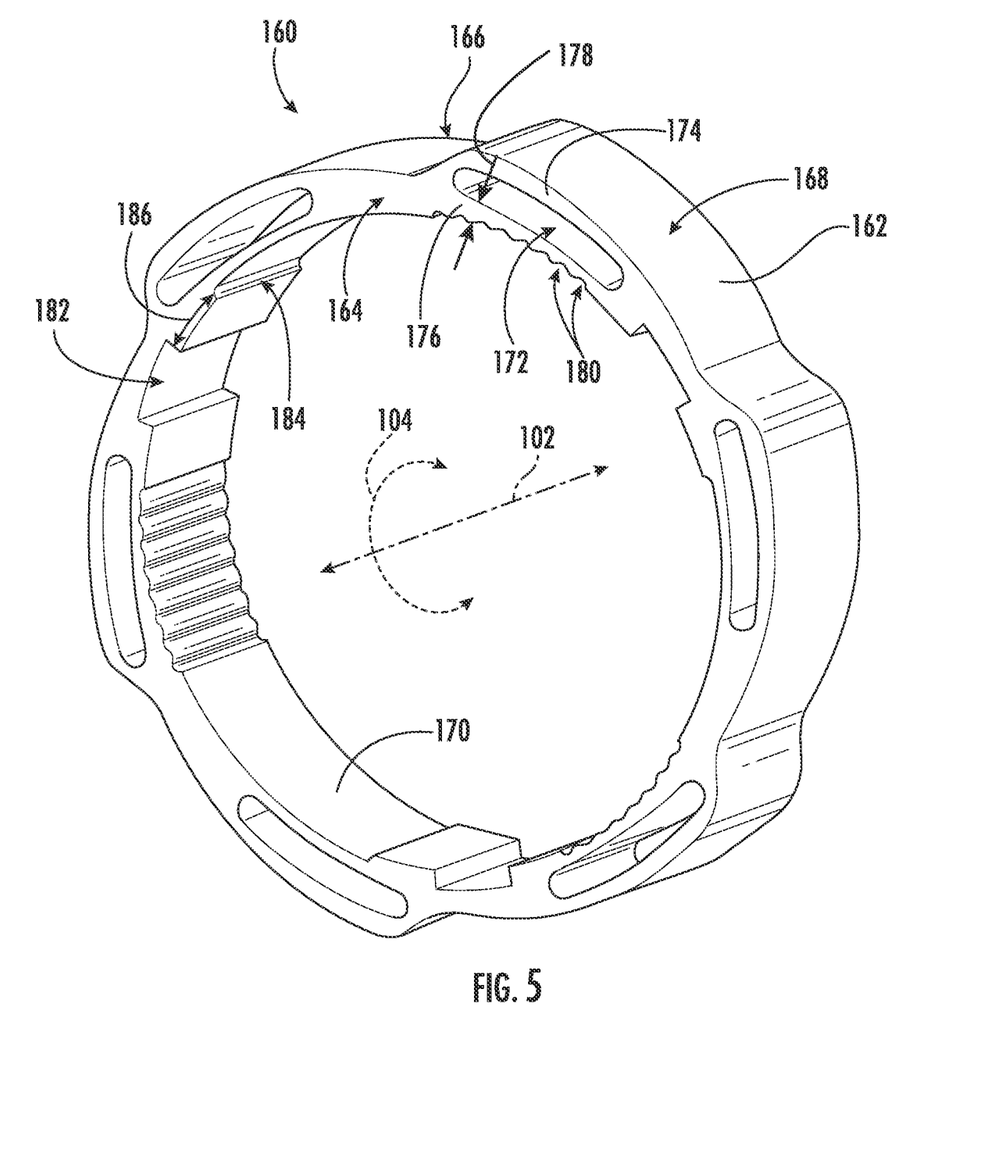
FIG. 5 is a perspective view of an adjustment collar of a variable nozzle in accordance with embodiments of the present disclosure.

Variable nozzle 100 may further include an adjustment collar 160. Adjustment collar 160 may be movably coupled to the attachment collar 130 and to the air control bodies 110. Movement of the adjustment collar 160 may advantageously cause movement of the air control bodies 110, such that diameter 120 is adjusted.

Adjustment collar 160 may, when assembled, be disposed around the attachment collar 130. Further, adjustment collar 160 may be movable relative to attachment collar 130. For example, adjustment collar 160 may be rotatable, such as about the longitudinal axis 102 and along the circumferential axis 104, relative to the attachment collar 130.

Adjustment collar 160 may include a body 162, which may be a generally annular body as shown and which may extend along the longitudinal axis 102 between a rear end 164 and a front end 166. Body 162 may include an exterior surface 168 and an opposing interior surface 170.

A plurality of adjustment channels 172 may be defined in the adjustment collar 160. The adjustment channels 172 may be disposed in a generally annular array. Each adjustment channel 172 may extend at least partially through the body 162, such as from the front end 166 towards or to the rear end 164. Each of the adjustment channels 172 may further have a generally arcuate shape. In exemplary embodiments, each of the plurality of adjustment channels 172 is angled relative to the circumferential axis 104, and thus does not extend exactly along the circumferential axis 104 from one side of the adjustment channel 172 to the other along the circumferential axis 104. As shown, each of the adjustment channels 172 may be defined between an upper collar portion 174 of the body 162 (which may include the exterior surface 168) and a lower collar portion 176 of the body 162 (which may include the interior surface 170). In exemplary embodiments, a thickness 178 of the lower collar portion 176, such as at each adjustment channel 172, may taper in a direction along the circumferential axis 104. For example, the thickness 178 may increase in the counterclockwise direction when viewed from the rear of the nozzle 100 and may decrease in the clockwise direction when viewed from the rear of the nozzle 100. Such taper may, for example, facilitate the offset angle of the adjustment channels 172 relative to the circumferential axis 104.

As shown, each extension rod 122 of the air control bodies 110 may be inserted into and thus disposed in one of the plurality of adjustment channels 172. As discussed, movement of the adjustment collar 160 may cause movement of the air control bodies 110. For example, rotation of the adjustment collar 160, such as about the longitudinal axis 102 and along the circumferential axis 104, may cause movement of the air control bodies 110. In exemplary embodiments, movement of the adjustment collar 160 about the longitudinal axis 102 and along the circumferential axis 104 may cause movement of each of the adjustment channels 172 relative to the extension rod 122 disposed in each such adjustment channel 172. This movement may cause the movement of the air control bodies 110.

Figure 6:
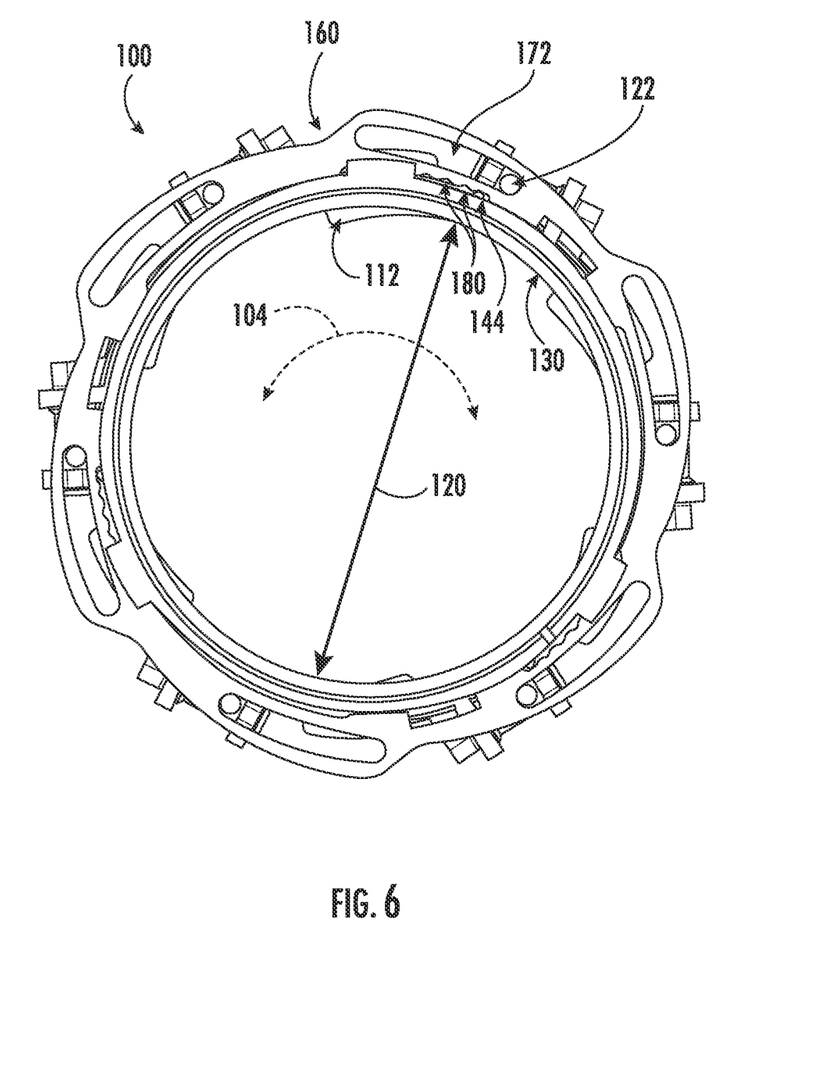
FIG. 6 is a rear view of a variable nozzle with an adjustment collar in a first position in accordance with embodiments of the present disclosure.
Figure 7:
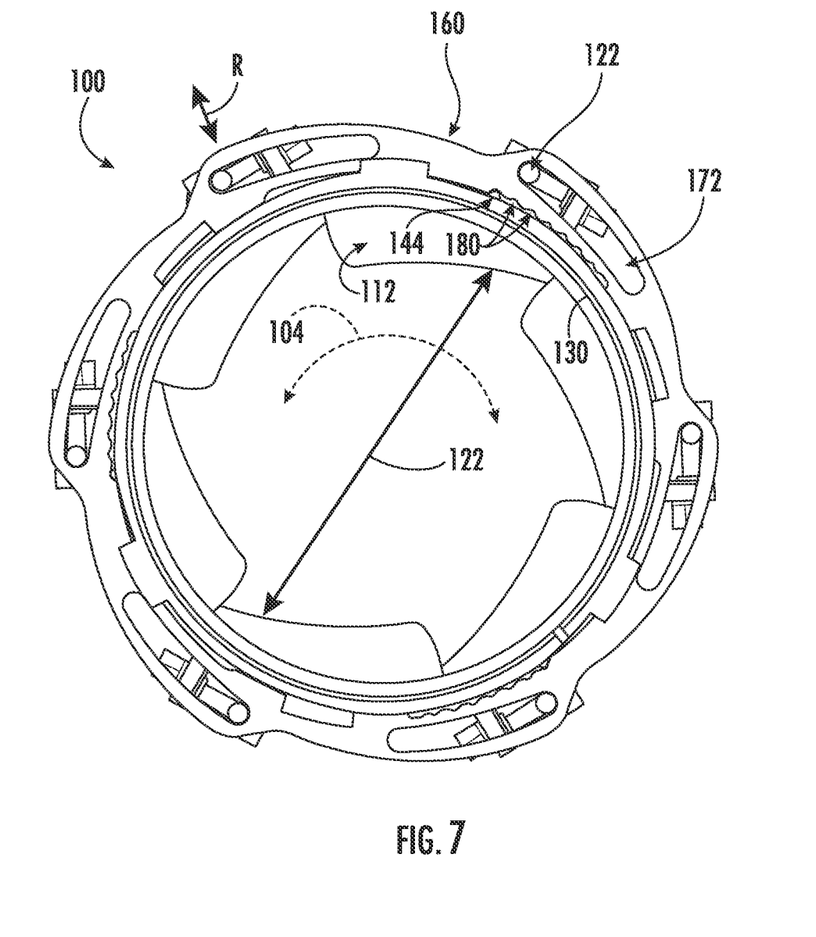
FIG. 7 is a rear view of a variable nozzle with an adjustment collar in a second position in accordance with embodiments of the present disclosure.

For example, and referring to FIGS. 6 and 7, air control bodies 110 may be adjusted between a plurality of positions, such as at least a first position and a second position as shown. As shown in FIG. 6, air control bodies 110 may be in a first position. To cause the bodies 110 to be in such position, adjustment collar 160 may be moved to a position wherein extension rods 122 are disposed in a first position in the adjustment channels 172. As shown in FIG. 7, air control bodies 110 may be in a second position different from the first position. To cause the bodies 110 to be in such position, adjustment collar 160 may be moved to a position wherein extension rods 122 are disposed in a second position different from the first position in the adjustment channels 172.

In exemplary embodiments, when the adjustment collar 160 and thus the adjustment channels 172 are moved between the various positions such as the first and second positions, such movement may cause movement of the extension rods 122 which in turn causes movement of the air control bodies 110. For example, due to the offset angle and/or thickness 178 taper of adjustment channels 172, when the adjustment channels 172 move, the extension rods 122 within the adjustment channels 172 may be caused to move in a radial direction R transverse to longitudinal axis 102. Such movement may cause movement of the air control bodies 110, such as pivoting of the air control bodies 110 about the hinge features, which may in turn cause movement of the air control surfaces 112 to increase and/or decrease the diameter 120.

FIG. 6 illustrates the air control bodies 110 in a first position, and FIG. 7 illustrates the air control bodies 110 in a second position. As shown, the diameter 120 in the second position is less than the diameter 120 in the first position, due to the movement of the adjustment collar 160 as discussed herein.

As shown, adjustment collar 160 may further include a plurality of grooves 180. The grooves 180 may be defined in the interior surface 170, such as at each of the adjustment channels 172. For example, grooves 180 may be defined in one or more of the lower collar portions 176. Grooves 180 may be selectively interactable with a detent 144. For example, when the adjustment collar 160 is moved, such as rotated, relative to the attachment collar 130 as discussed herein, grooves 180 may be rotated over an associated detent 144 such that the detent 144 is selectively positionable in one of a subset of grooves 180 with which the detent 144 is associated. Each groove 180 may define a position of the adjustment collar 160 and thus a position of the air control bodies 110 as discussed herein.

Figure 8:
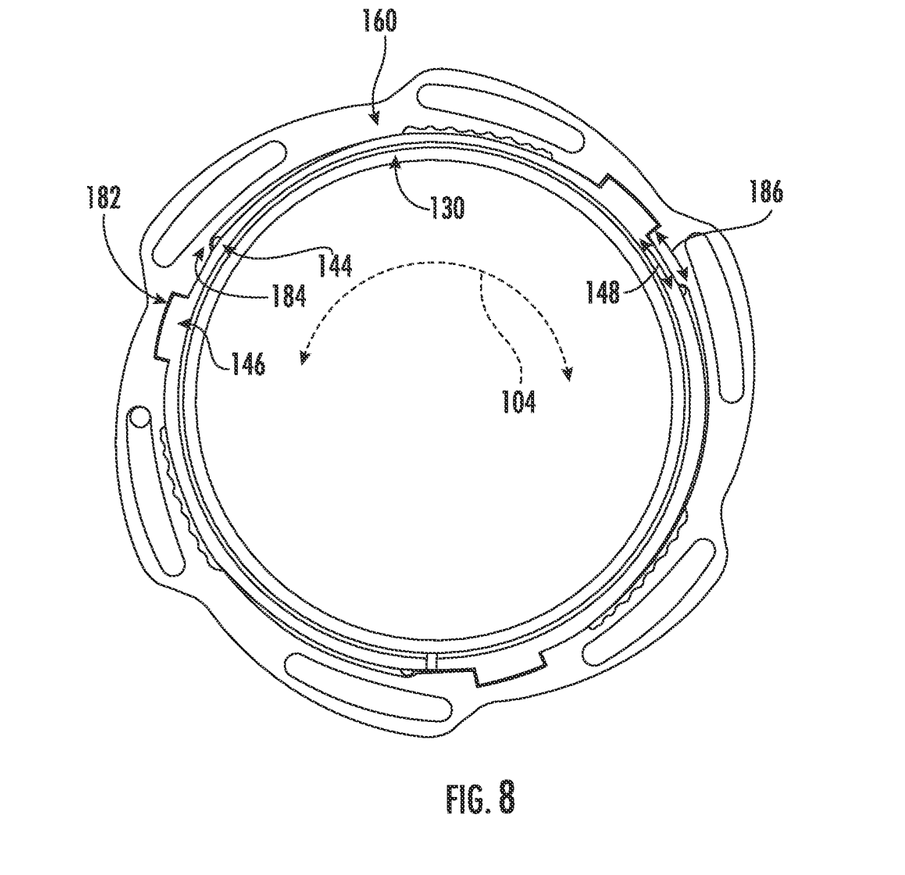
FIG. 8 is a rear view of components of a variable nozzle with an adjustment collar in an assembly position in accordance with embodiments of the present disclosure.

Referring now specifically to FIG. 8, an adjustment collar 160 and attachment collar 130 are illustrated in an assembly position. As discussed, attachment collar 130 may include one or more assembly tabs 146. Adjustment collar 160 may define one or more assembly channels 182. Each assembly channel 182 may, for example, be defined in the interior surface 170 of the adjustment collar 160. Each assembly channel 182 may extend through the body 162 along the longitudinal axis, such as from the rear end 164 to the front end 166.

Further, in some embodiments, one or more stops 184 may be defined by the interior surface 170. Each stop 184 may extend through the body 162 along the longitudinal axis, such as from the rear end 164 to the front end 166. A distance 186, such as an annular distance along the circumferential axis 104, may be defined at the rear end 164 between an associated stop 184 and assembly channel 182.

Assembly channel(s) 182 may advantageously interact with assembly tab(s) 146 during assembly of nozzles 100 to facilitate ease of assembly and operation of the nozzles 100. For example, adjustment collar 160 must be rotated such that tab(s) 146 align with channel(s) 182 (about the longitudinal axis 102 and along the circumferential axis 104) in order to properly align and position the adjustment collar 160 over and around the attachment collar 130.

Further, in exemplary embodiments, distance 148 may be greater than or equal to distance 186. Accordingly, when assembled, detents 144 may be disposed near or against stops 184, and stops 184 may prevent rotation of the adjustment collar 160 relative to the attachment collar 130 in one direction about the longitudinal axis 102 and along the circumferential axis 104, such as in the clockwise direction as shown. Movement of the adjustment collar 160 relative to the attachment collar 130 in the opposing direction (such as counterclockwise) may be allowed, and the adjustment collar 160 may be so moved until, for example, the detents 144 are seated in ones of the plurality of grooves 180.

Further aspects of the invention are provided by one or more of the following embodiments:

A blower which includes a fan, and a main body housing the fan, the main body defining an airflow path extending between an inlet end and an outlet end. The blower further includes a variable nozzle disposed at the outlet end, the variable nozzle defining a longitudinal axis and a circumferential axis. The variable nozzle includes an attachment collar, the attachment collar comprising a body defining an exterior surface and an interior surface and extending along the longitudinal axis. The variable nozzle further includes a plurality of air control bodies, each of the plurality of air control bodies movably connected to the attachment collar and comprising an air control surface and an extension rod. The variable nozzle further includes an adjustment collar, the adjustment collar disposed around the attachment collar and defining a plurality of adjustment channels, wherein each of the plurality of extension rods is disposed in one of the plurality of adjustment channels.

A blower in accordance with one or more embodiments, wherein rotation of the adjustment collar about the longitudinal axis causes movement of the plurality of air control bodies.

A blower in accordance with one or more embodiments, wherein rotation of the adjustment collar about the longitudinal axis causes movement of each of the plurality of adjustment channels relative to the extension rod disposed therein.

A blower in accordance with one or more embodiments, wherein each of the plurality of adjustment channels is angled relative to the circumferential axis.

A blower in accordance with one or more embodiments, wherein each of the plurality of adjustment channels is defined between an upper collar portion and a lower collar portion, and wherein a thickness of the lower collar portion tapers in a direction along the circumferential axis.

A blower in accordance with one or more embodiments, wherein the attachment collar further comprises a detent extending from the exterior surface and along the longitudinal axis, wherein an interior surface of the adjustment collar defines a plurality of grooves, and wherein the detent is selectively positionable in one of the plurality of grooves.

A blower in accordance with one or more embodiments, further comprising an assembly tab extending from the exterior surface, and wherein the interior surface of the adjustment collar defines an assembly channel extending along the longitudinal direction.

A blower in accordance with one or more embodiments, further comprising a stop defined by the interior surface of the adjustment collar, and wherein an annular distance between the assembly tab and the detent is greater than or equal to an annular distance between the assembly channel and the stop.

A blower in accordance with one or more embodiments, further comprising a lip extending from the interior surface of the attachment collar.

A blower in accordance with one or more embodiments, wherein the plurality of air control bodies are disposed in an annular array about the longitudinal axis and define a maximum inner diameter at a tip end of the plurality of air control surfaces.

A blower in accordance with one or more embodiments, wherein movement of the plurality of air control bodies adjusts the maximum inner diameter.

A blower in accordance with one or more embodiments, wherein rotation of the adjustment collar about the longitudinal axis causes movement of each of the plurality of adjustment channels relative to the extension rod disposed therein and in turn causes movement of the plurality of air control bodies.

A variable nozzle having components or features in accordance with one or more embodiments as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A blower, comprising:
   a fan;
   a main body housing the fan, the main body defining an airflow path extending between an inlet end and an outlet end;
   a handle connected to the main body for handheld operation; and
   a variable nozzle disposed at the outlet end, the variable nozzle defining a longitudinal axis and a circumferential axis and comprising:
      an attachment collar, the attachment collar comprising a body defining an exterior surface and an interior surface and extending along the longitudinal axis;
      a plurality of air control bodies, each of the plurality of air control bodies movably connected to the attachment collar and comprising an air control surface and an extension rod; and
      an adjustment collar, the adjustment collar disposed around the attachment collar and defining a plurality of adjustment channels, wherein each of the plurality of extension rods is disposed in one of the plurality of adjustment channels,
   wherein each of the plurality of adjustment channels is defined between an upper collar portion and a lower collar portion, and wherein a thickness of the lower collar portion tapers in a direction along the circumferential axis.

2. The blower of claim 1, wherein rotation of the adjustment collar about the longitudinal axis causes movement of the plurality of air control bodies.

3. The blower of claim 1, wherein rotation of the adjustment collar about the longitudinal axis causes movement of each of the plurality of adjustment channels relative to the extension rod disposed therein.

4. The blower of claim 1, wherein each of the plurality of adjustment channels is angled relative to the circumferential axis.

5. The blower of claim 1, wherein the attachment collar further comprises a detent extending from the exterior surface and along the longitudinal axis, wherein an interior surface of the adjustment collar defines a plurality of grooves, and wherein the detent is selectively positionable in one of the plurality of grooves.

6. The blower of claim 5, further comprising an assembly tab extending from the exterior surface, and wherein the interior surface of the adjustment collar defines an assembly channel extending along the longitudinal direction.

7. The blower of claim 6, further comprising a stop defined by the interior surface of the adjustment collar, and wherein an annular distance between the assembly tab and the detent is greater than or equal to an annular distance between the assembly channel and the stop.

8. The blower of claim 1, further comprising a lip extending from the interior surface of the attachment collar.

9. The blower of claim 1, wherein the plurality of air control bodies are disposed in an annular array about the longitudinal axis and define a maximum inner diameter at a tip end of the plurality of air control surfaces.

10. The blower of claim 9, wherein movement of the plurality of air control bodies adjusts the maximum inner diameter.

11. A blower, comprising:
    a fan;
    a main body housing the fan, the main body defining an airflow path extending between an inlet end and an outlet end;

a handle connected to the main body for handheld operation; and a variable nozzle disposed at the outlet end, the variable nozzle defining a longitudinal axis and a circumferential axis and comprising:
- an attachment collar, the attachment collar comprising a body defining an exterior surface and an interior surface and extending along the longitudinal axis;
- a plurality of air control bodies, each of the plurality of air control bodies movably connected to the attachment collar and comprising an air control surface and an extension rod; and
- an adjustment collar, the adjustment collar disposed around the attachment collar and defining a plurality of adjustment channels, wherein each of the plurality of extension rods is disposed in one of the plurality of adjustment channels, wherein rotation of the adjustment collar about the longitudinal axis causes movement of each of the plurality of adjustment channels relative to the extension rod disposed therein and in turn causes movement of the plurality of air control bodies, wherein each of the plurality of adjustment channels is defined between an upper collar portion and a lower collar portion, and wherein a thickness of the lower collar portion tapers in a direction along the circumferential axis.

12. The blower of claim 11, wherein each of the plurality of adjustment channels is angled relative to the circumferential axis.

13. The blower of claim 11, wherein the attachment collar further comprises a detent extending from the exterior surface and along the longitudinal axis, wherein an interior surface of the adjustment collar defines a plurality of grooves, and wherein the detent is selectively positionable in one of the plurality of grooves.

14. The blower of claim 13, further comprising an assembly tab extending from the exterior surface, and wherein the interior surface of the adjustment collar defines an assembly channel extending along the longitudinal direction.

15. The blower of claim 14, further comprising a stop defined by the interior surface of the adjustment collar, and wherein an annular distance between the assembly tab and the detent is greater than or equal to an annular distance between the assembly channel and the stop.

16. The blower of claim 11, further comprising a lip extending from the interior surface of the attachment collar.

17. The blower of claim 11, wherein the plurality of air control bodies are disposed in an annular array about the longitudinal axis and define a maximum inner diameter at a tip end of the plurality of air control surfaces.

18. The blower of claim 17, wherein movement of the plurality of air control bodies adjusts the maximum inner diameter.

* * * * *